US009147171B2

(12) United States Patent
Sitarski

(10) Patent No.: US 9,147,171 B2
(45) Date of Patent: Sep. 29, 2015

(54) PLANNING A RESPONSE TO AN UNPLANNED EVENT

(75) Inventor: Edward M. Sitarski, Toronto (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1953 days.

(21) Appl. No.: 11/975,820

(22) Filed: Oct. 22, 2007

(65) Prior Publication Data

US 2008/0133299 A1 Jun. 5, 2008

Related U.S. Application Data

(60) Provisional application No. 60/853,494, filed on Oct. 20, 2006.

(51) Int. Cl.
*G06Q 10/00* (2012.01)
*G06Q 10/06* (2012.01)
*G06Q 10/08* (2012.01)

(52) U.S. Cl.
CPC ............ *G06Q 10/06* (2013.01); *G06Q 10/0631* (2013.01); *G06Q 10/0633* (2013.01); *G06Q 10/0635* (2013.01); *G06Q 10/06375* (2013.01); *G06Q 10/087* (2013.01)

(58) Field of Classification Search
CPC .................................................. G06Q 10/0631
USPC ............................................... 705/7.11–7.42
See application file for complete search history.

(56) References Cited

U.S. PATENT DOCUMENTS

| | | | | |
|---|---|---|---|---|
| 7,082,605 | B2* | 7/2006 | Alletson et al. | 718/100 |
| 2002/0138324 | A1* | 9/2002 | Zarefoss et al. | 705/8 |
| 2002/0169657 | A1* | 11/2002 | Singh et al. | 705/10 |
| 2003/0046130 | A1* | 3/2003 | Golightly et al. | 705/7 |
| 2003/0125998 | A1* | 7/2003 | McKenney et al. | 705/7 |
| 2004/0064436 | A1* | 4/2004 | Breslin et al. | 707/1 |
| 2004/0103431 | A1* | 5/2004 | Davenport et al. | 725/33 |
| 2004/0172321 | A1* | 9/2004 | Vemula et al. | 705/8 |
| 2004/0260703 | A1* | 12/2004 | Elkins et al. | 707/100 |
| 2005/0004824 | A1* | 1/2005 | Sheffler et al. | 705/7 |
| 2006/0108241 | A1* | 5/2006 | Smith | 206/223 |

OTHER PUBLICATIONS

Ozdamar et al. "Emergency Logistics Planning in Natural Disasters" (2004) Annals of Operations Research 129, p. 217-245.*
Cognos "Better Practices in Enterprise Planning" (2003).*
Chen et al. "An Advanced Planning and Control System for Discrete Manufacturing" (1993) CompEuro '93. p. 139-145.*
Forget et al. "Collaborative Event Management in Supply Chains: an Agent-Based Approach" (Sep. 2006) in FPIP International Federation for Information Processing, vol. 220, Information Technology for Balanced Manufacturing Systems, ed. Shen, W., (Boston: Springer), pp. 89-98.*

(Continued)

*Primary Examiner* — Sujay Koneru
(74) *Attorney, Agent, or Firm* — Kraguljac Law Group, LLC

(57) ABSTRACT

Systems, methodologies, media, and other embodiments associated with planning a response to an unplanned event are described. One example computer implemented method includes solving a model with no unplanned events applied, modifying the model by applying an unplanned event to the model, freezing a plan up to the unplanned event effective date, and solving the modified model. A plan associated with the modified model may then be provided as an output.

23 Claims, 13 Drawing Sheets

(56) References Cited

OTHER PUBLICATIONS

Fox et al. "Agent-Oriented Supply Chain Management" (2000) The International Journal of Flexible Manufacturing Systems, 12(2000):165-188.*

Fox et al. "The Integrated Supply Chain Management System" (1993).*

Atkinson "Supply Chain Management: New Opportunities for Risk Managers" (Jun. 2006) Risk Management.*

Ye et al; "Detection and Reaction to Unplanned Operational Events in Large Scale Distributed Real-Time Embedded Systems", Parallel and Distributed Processing Symposium, 2005. Proceedings. 19th IEEE International, Apr. 4-8, 2005. pp. 1-4.

\* cited by examiner

PLANNING A RESPONSE TO AN UNPLANNED EVENT

CROSS REFERENCE TO RELATED APPLICATIONS

This application claims priority to U.S. Provisional Application No. 60/853,494 titled "Planning an Optimized Response to an Unplanned Event", which was filed Oct. 20, 2006.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

An enterprise planning system (EPS) may be used by manufacturing companies, distribution companies, and so on, to facilitate managing, for example, supply chain risk. A conventional EPS facilitates planning steady state operations for an enterprise. A conventional EPS may therefore model supply chain entities including, for example, suppliers, manufacturers, distribution channels, warehouses, supply, demand, transportation, and so on. The model may include representations of costs, capacity, and other entity attributes. The model may be extended into the future to deal with a planning interval known as a "planning horizon". Entity attributes may change over the planning horizon. Some changes may be known (e.g., seasonal fluctuations) while others may be unknown (e.g., plant shutdown due to flu outbreak).

A conventional EPS may use techniques including, for example, linear programming, heuristics, constraint programming, and so on, to build a plan based on the modeled entities. The plan may seek to meet business objectives including minimizing cost, maximizing profit, maximizing customer service, and so on. However, a conventional EPS may be suboptimal with respect to accounting for, simulating, and/or pre-planning for unplanned events including, for example, weather (e.g., hurricane, tornado), civil unrest (e.g., riot, demonstration), political unrest (e.g., coup), shortages, currency fluctuations, "Acts of God" (e.g., tsunami, fire, flood), and so on.

As access to worldwide markets increases and supply and outsourcing opportunities grow, manufacturing and distribution companies continue to expand their operations globally. The global operations may be tuned with respect to minimizing work in progress (WIP), optimizing just in time (JIT) delivery, and so on. Although there are benefits to global operations and streamlined inventory control, there are also global risks that can threaten the success of their operations. To manage these risks, companies may seek to understand the impact of unplanned events on operations. Based on this understanding, companies can then make appropriate investments in the supply chain flexibility and redundancy. These investments may make the difference between success and oblivion.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
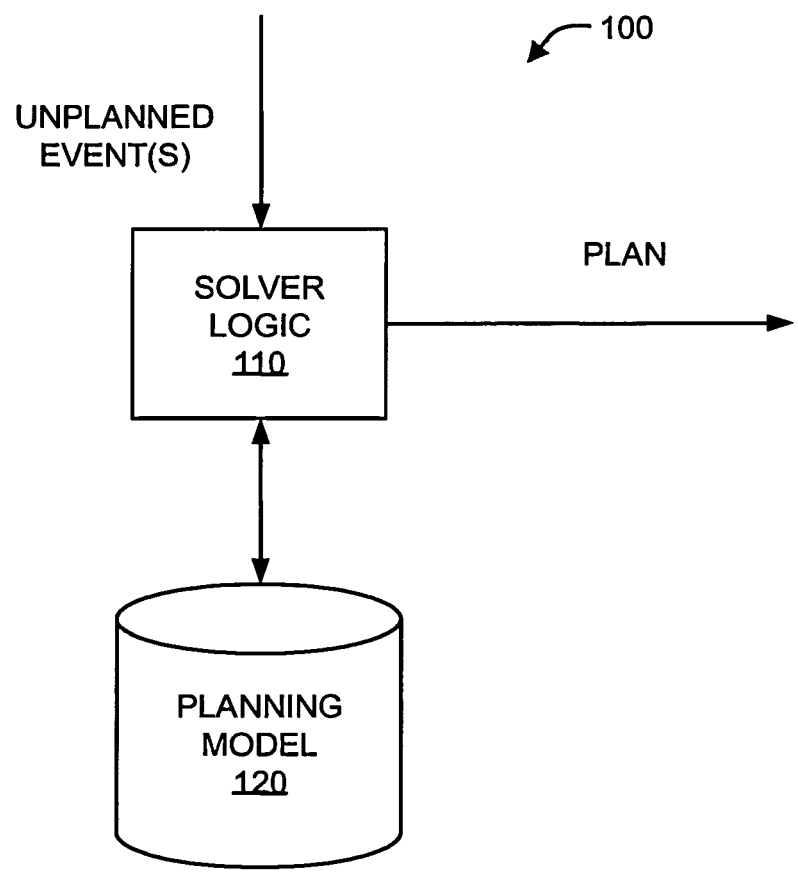
FIG. 1 illustrates an example system associated with planning a response to an unplanned event.

Example systems, methods, and other embodiments are described herein that relate to planning responses to unplanned events associated with, for example, an EPS. The EPS may be concerned, for example, with managing supply chain risk. In one embodiment, an unplanned event system includes a solver logic and a planning model with which the solver logic interacts. The solver logic first computes a plan to solve the model before any unplanned events are considered. The solver logic then receives information regarding an unplanned event(s) (e.g., from a user) and determines a solution (e.g., plan) based on the planning model and unplanned events. The plan will not reach back in time to pre-account for an unplanned event but rather will provide information for going forward based on an unplanned event that occurs at a point in time. Example systems and methods may include a data structure (e.g., record, rule) to represent an unplanned event and a method for planning responses to unplanned events represented by such a data structure. The method for planning responses to unplanned events may input instances of the data structure.

Example systems and methods may include a representation of unplanned events. The unplanned event may cause an enterprise plan to be updated to reflect the impact of the event. The representation may be, for example, a record, a data structure, a set of rules, an object, and so on. Example systems and methods may also include logic for applying an unplanned event representation to an enterprise model. The logic facilitates simulating the occurrence of an unplanned event and thus, in turn, facilitates generating a response (e.g., optimal response). While an optimal response is described, in some cases the reaction to an unplanned event may be so time critical that an immediate "acceptable" response may be more desirable than a later-provided optimal response.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that stores signals, instructions and/or data, and can participate in directly or indirectly providing the signals, instructions and/or data. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, optical media, punch cards, paper tape, other physical medium with patterns of holes, a random access memory (RAM), a read only memory (ROM), a programmable ROM (PROM), other memory chip or card, a memory stick, and other media from which a computer, a processor or other electronic device can read.

"Logic", as used herein, includes but is not limited to hardware, firmware, a non-transitory computer-readable medium storing software and/or combinations of each to perform a function(s) or an action(s), and/or to cause a function or action from another logic, method, and/or system. For example, based on a desired application or needs, logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software may also be implemented in a variety of executable and/or loadable forms including, but not limited to, a stand-alone program, a servelet, an applet, instructions stored in a memory, part of an operating system, and so on. It will be appreciated by one skilled in the art that computer-readable and/or executable instructions can be located in one logic and/or distributed between two or more communicating, co-operating, and/or parallel processing logics and thus can be loaded and/or executed in serial, parallel, massively parallel and other manners.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Consider an unplanned event (e.g., major hurricane in the Gulf of Mexico) that has a temporary yet catastrophic effect (e.g., shuts down shipping on the Gulf coast in August), and imagine how an entity with a supply chain (e.g., construction supplies company) will respond. A hurricane is a low probability, high-impact event. It may be prohibitively expensive and therefore may not satisfy a risk-reward ratio to stockpile inventory in anticipation of shipping disruptions that may not occur. Example systems and methods facilitate creating a plan to respond to an unplanned event (e.g., a hurricane) rather than anticipating the unplanned event. The response plan will take into account the state of the enterprise up to the point in time at which the unplanned event occurs and then determine a response to the unplanned event. In one example, the response may be optimized with respect to criteria (e.g., cost, profit, throughput, user satisfaction). In one example, the criteria for which a response may be optimized may be user configurable.

Turning to FIG. 1, an unplanned event system 100 is illustrated. The system 100 includes a solver logic 110 and a planning model 120. The solver logic 110 receives information regarding one or more unplanned events (e.g., from a user) and determines a solution (plan) based on the planning model 120 and the unplanned events.

In one example, an unplanned event is represented by a set of rules that modify attributes of entities in a planning model 120. The event may have an "effective date/time" indicating when the event begins and an "end date/time" indicating when the event ends. Unplanned event rules may include, for example, setting an entity attribute to a fixed value, adjusting an entity attribute by using a mathematical function, substituting an entity attribute value with an externally specified data value, and so on. Setting an entity attribute to a fixed value may include, for example, setting a supplier capacity to zero, setting a transportation carrying capacity to x units per day, setting a warehousing capacity to y units, and so on. These values may reflect assumptions and/or observed facts concerning how an entity in a supply chain will operate under certain conditions. For example, setting a supplier capacity to zero may reflect an assumption concerning supplier capacity during a strike. Adjusting an entity attribute by a mathematical function may include, for example, setting a supplier capacity to x% of capacity (e.g., 25%). This function may also reflect assumptions concerning how the entity in a supply chain will operate under certain conditions. For example, during a flu outbreak or during energy rationing or crises (e.g., brown out), a plant may still operate but at a reduced capacity. Substituting an entity attribute value with an externally specified data value may include, for example, importing values from different forecasts. The forecasts may range from pessimistic to optimistic and may be based on factors that affect supply chain entities. Unplanned event representations can be combined together to form a "scenario". They can be used to model unexpected changes that are positive or negative to an enterprise.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 2:
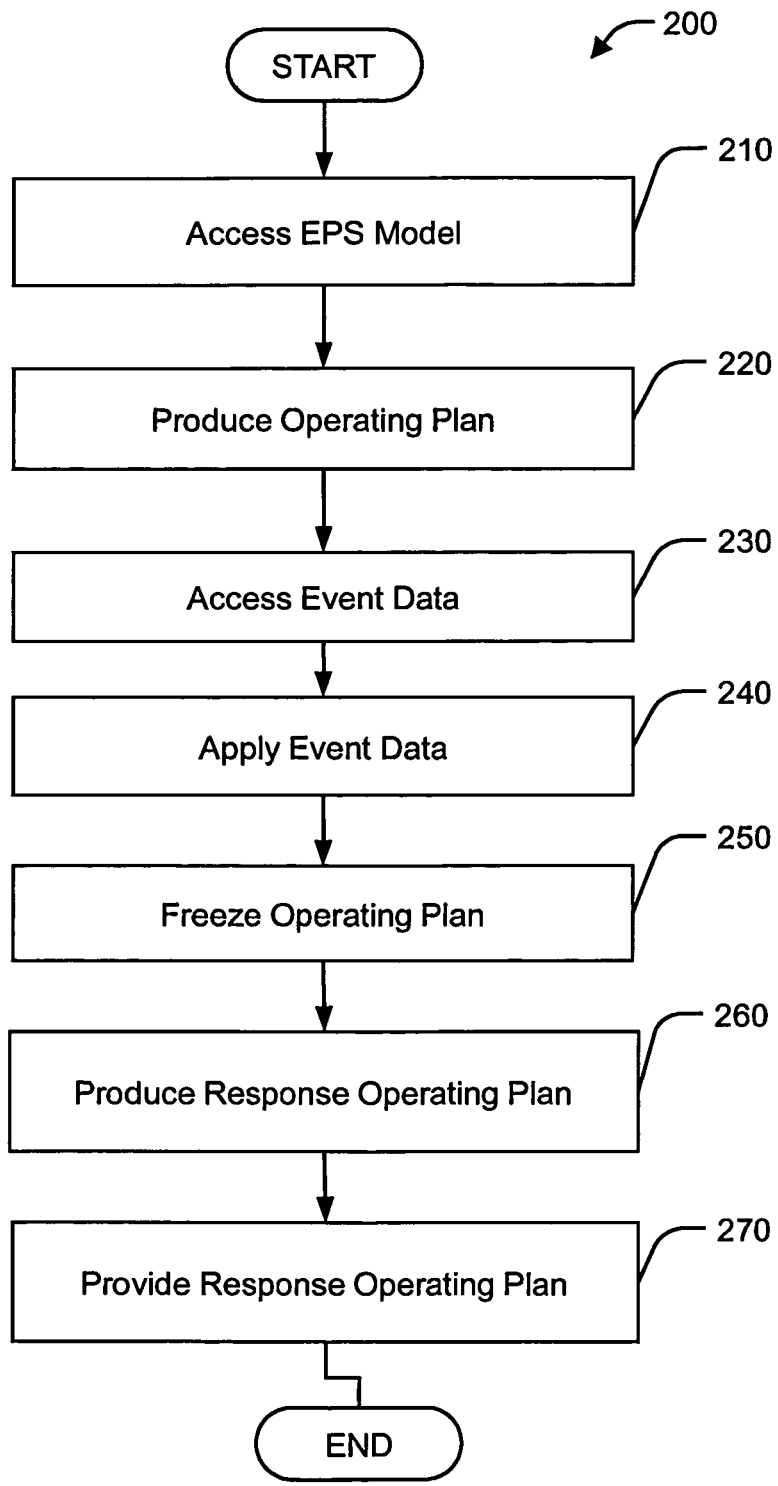
FIG. 2 illustrates an example method for planning a response to an unplanned event.

FIG. 2 illustrates an example method 200 for planning a response to an unplanned event. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 2, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques.

In one example, methods are implemented as processor executable instructions and/or operations stored on a computer-readable medium. Thus, in one example, a computer-readable medium may store processor executable instructions operable to perform a method for planning optimized responses to unplanned events. While the above method is described being stored on a computer-readable medium, it is to be appreciated that other example methods described herein can also be stored on a computer-readable medium.

FIG. 2 illustrates a computer-implemented method 200 for planning a response to an unplanned event. In one example, the solver logic 110 (FIG. 1) can perform the method 200 as illustrated in the flow chart of FIG. 2. Method 200 may include, at 210, accessing a model associated with an EPS. In one example, the model may include data that describes entities having entity attributes. The entities may be, for example, supply chain entities. In one example, the attributes may be concerned with describing entity properties associated with managing supply chain risk.

Method 200 may also include, at 220, producing an operating plan that solves the model with respect to a set of solution criteria. The model is to be solved first before any unplanned events are applied. The model may be solved up to a point in time or solved for the entire available planning horizon. Solving the model may include producing a plan (e.g., orders, deliveries, purchases, warehousing) for entities in a supply chain. Solving the model with respect to the set of solution criteria may involve pursuing different business objectives. For example, solving the model may include maximizing a member of the set of solution criteria (e.g., profit), minimizing a member of the set of solution criteria (e.g., cost), balancing two or more members of the set of solution criteria (e.g., profit and risk), and reducing the variance in a member of the set of solution criteria (e.g., throughput). In one example, the solution criteria may be user configurable. Thus, it is to be appreciated that method 200 may produce plans for EPS models based on different criteria and different business objectives. In different examples the set of solution criteria may include a cost criteria, a time criteria, a continuity criteria, a profit criteria, a user satisfaction criteria, a throughput criteria, a risk avoidance criteria, and so on. Similarly, business objectives may include minimizing, maximizing, balancing, and so on. While criteria associated with managing supply chain risk are described, it is to be appreciated that an EPS model associated with other entities may be solved.

Method 200 may also include, at 230, accessing a set of event data that describes an unplanned event to be applied to the model. In one example, the set of event data may include an entity identifier, an event effective time, an event end time, and an entity attribute modifier. The entity identifier may be, for example, a pointer, a globally unique identifier (GUID), an address, a record index, and so on. The event effective time may describe when an event is to become active (e.g., occur). This may be specified as, for example, a date, a time, an occurrence of an event, and so on. The event end time may describe when an event is to no longer be active. Once again this may be specified as a date, a time, an occurrence of an event, and so on. While four properties are described, it is to be appreciated that in some examples an entity may be described by a greater and/or lesser number of properties. For example, an end time may be replaced by a start time and a duration.

Method 200 may also include, at 240, applying the unplanned event to the model to produce an updated model. Applying the unplanned event causes the unplanned event to be considered when the updated model is solved to produce a response plan. When multiple unplanned events are to be presented and considered, they may be presented in chronological order. Attributes of entities in the model may be modified as specified by the unplanned event. For example, a transportation lane may be disrupted, a supplier made unavailable, a warehouse may have its capacity reduced (e.g., fire), and so on. Thus, an entity attribute (e.g., Supplier A capacity) may be manipulated. In one example, applying the unplanned event data to the model may include changing an entity attribute for an entity in the model in response to the entity attribute modifier. As described above, the entity attribute modifier may take different forms. For example, the entity attribute modifier may describe a fixed value for an entity attribute, may describe a function for modifying an entity attribute based on an existing value for the entity attribute, may be a reference to an external value, and so on.

Method 200 may also include, at 250, freezing a portion of the operating plan up to a point in time related to an effective time associated with the unplanned event to produce a partially invariant operating plan. The partially invariant operating plan will be unchangeable up to the point in time and changeable after the point in time. The model and/or plan may be frozen to that point in time to facilitate processing unplanned events on a going forward basis. This prevents a solution from anticipating the impact of the unplanned event before it happens and accounting for the unplanned event by reaching back in time to pre-account for the event.

Method 200 may also include, at 260, producing a response operating plan that solves the updated model with respect to the solution criteria in light of the partially invariant operating plan, the updated model, and the unplanned event. The response operating plan may provide for different types of responses. For example, the response operating plan may provide an optimal response, an acceptable response, a "first solution" response, and a best possible response as computed within a response period of time. By way of illustration, when method 200 is being used in a planning scenario, sufficient computing time may be available to produce an optimal response. However, when method 200 is being used in a disaster response mode, then sufficient computing time may only be available to produce an acceptable response. Thus, a first acceptable response may be provided initially that will allow an entity to respond in a timely fashion to an unplanned event.

Method 200 may also include, at 270, providing the response operating plan. Providing the response operating plan may include, for example, fixing the response operating plan in a tangible medium (e.g., computer readable medium), displaying a portion(s) of the response operating plan to a user (e.g., on a computer display), and so on.

To further illustrate the system 100 and the method 200, consider the following simplified enterprise example explained with respect to FIGS. 3-11. Those skilled in the art will recognize that a model associated with a sophisticated supply chain would take into account more (e.g., millions) variables.

Figure 3:
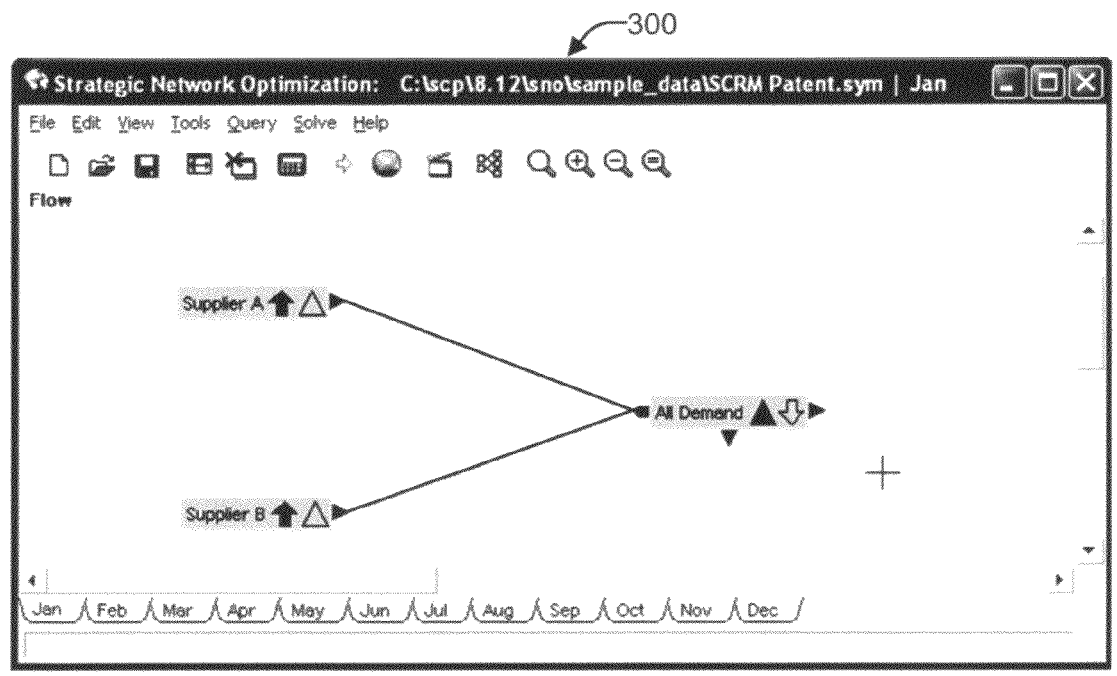
FIG. 3 illustrates an example enterprise model.

Three entities are shown in the enterprise model diagram 300 illustrated in FIG. 3. These entities include a demand location (All Demand) and two suppliers (Supplier A and Supplier B). The planning horizon associated with diagram 300 extends for 12 months (e.g., January. to December. ). Supplier A and Supplier B can both supply product that can satisfy the demand associated with the demand point. Assume that product from Supplier A costs $5/unit and that product from Supplier B costs $8/unit. These costs may be recorded as, for example, a supplier cost attribute associated with each supplier entity. Assume that there is a maximum of 100 units of product available from Supplier A per month but no limit to the product available at Supplier B. These capacities may be recorded as, for example, a supplier capacity attribute associated with each supplier entity. Assume that inventory can be kept at the demand point at a cost of $0.1/unit/month. This inventory and its cost may be recorded, for example, as an inventory cost attribute associated with a demand entity. A separate entity attribute may record, for example, warehouse capacity.

One EPS solver logic may be configured to minimize the total costs of meeting demand. While a minimize cost example is provided, it is to be appreciated that in one example a solver logic may be configurable (e.g., user configurable) to solve on different criteria (e.g., cost, price, time, productivity, profit, user satisfaction) and using different goals (e.g., minimize, maximize, balance). The minimize example may be represented with a linear objective function and constraints as shown below and solved using known techniques (e.g., linear programming).

Minimize $$5 * (A_1 + A_2 + A_3 + A_4 + A_5 + A_6 + A_7 + A_8 + A_9 + A_{10} + A_{11} + A_{12}) + 8 * (B_1 + B_2 + B_3 + B_4 + B_5 + B_6 + B_7 + B_8 + B_9 + B_{10} + B_{11} + B_{12}) + 0.1 * (I_1 + I_2 + I_3 + I_4 + I_5 + I_6 + I_7 + I_8 + I_9 + I_{10} + I_{11} + I_{12})$$

Subject to:

$$A_1 + B_1 - I_1 \geq D_1$$
$$A_2 + B_2 + I_1 - I_2 \geq D_2$$
$$A_3 + B_3 + I_2 - I_3 \geq D_3$$
$$A_4 + B_4 + I_3 - I_4 \geq D_4$$
$$A_5 + B_5 + I_4 - I_5 \geq D_5$$
$$A_6 + B_6 + I_5 - I_6 \geq D_6$$
$$A_7 + B_7 + I_6 - I_7 \geq D_7$$
$$A_8 + B_8 + I_7 - I_8 \geq D_8$$
$$A_9 + B_9 + I_8 - I_9 \geq D_9$$
$$A_{10} + B_{10} + I_9 - I_{10} \geq D_{10}$$
$$A_{11} + B_{11} + I_{10} - I_{11} \geq D_{11}$$
$$A_{12} + B_{12} + I_{11} - I_{12} \geq D_{12}$$

where all $A_{1...12}, B_{1...12}, I_{1...12} \geq 0$ and all $A_{1...12} \leq 100$ where:

$A_n$ is the units/quantity of product from supplier A in month n;

$B_n$ is the units/quantity of product from supplier B in month n;

$I_n$ is the units of product in inventory in month n;

$D_n$ is the quantity of demand for month n; and, the subscripts 1 . . . 12 correspond to the months January . . . December.

Figure 4:
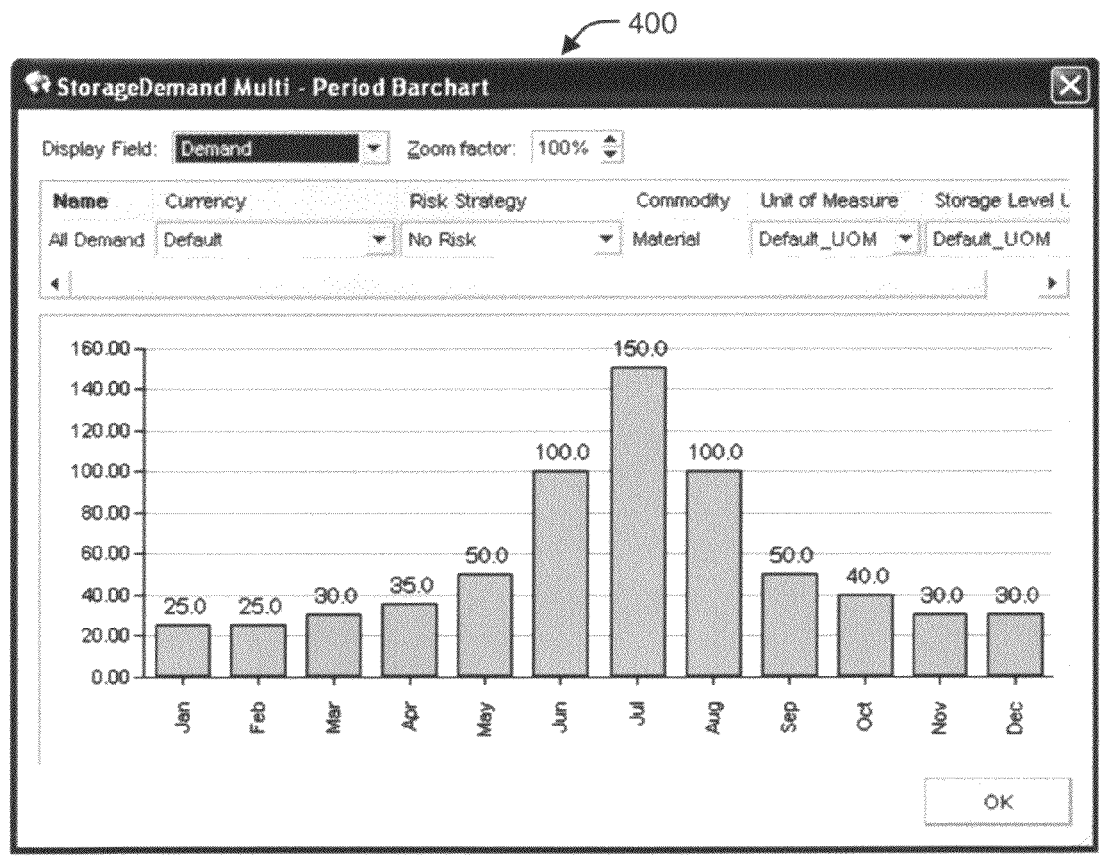
FIG. 4 illustrates an example "quantity of demand at demand point" graph.
Figure 5:
FIG. 5 illustrates an example "deliveries from Supplier A in optimal plan" graph, where the plan is undisturbed by unplanned events.
Figure 6:
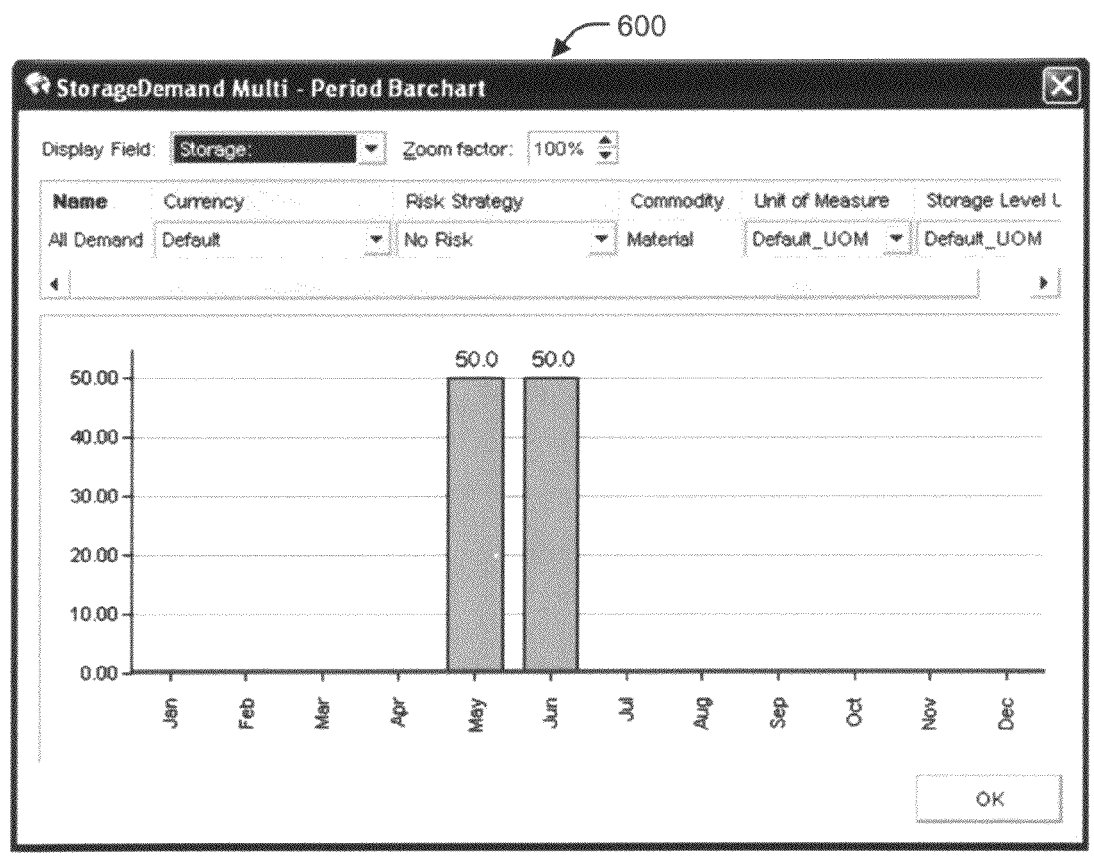
FIG. 6 illustrates an example "inventory levels at demand point in optimal solution" graph, where the plan is undisturbed by unplanned events.
Figure 7:
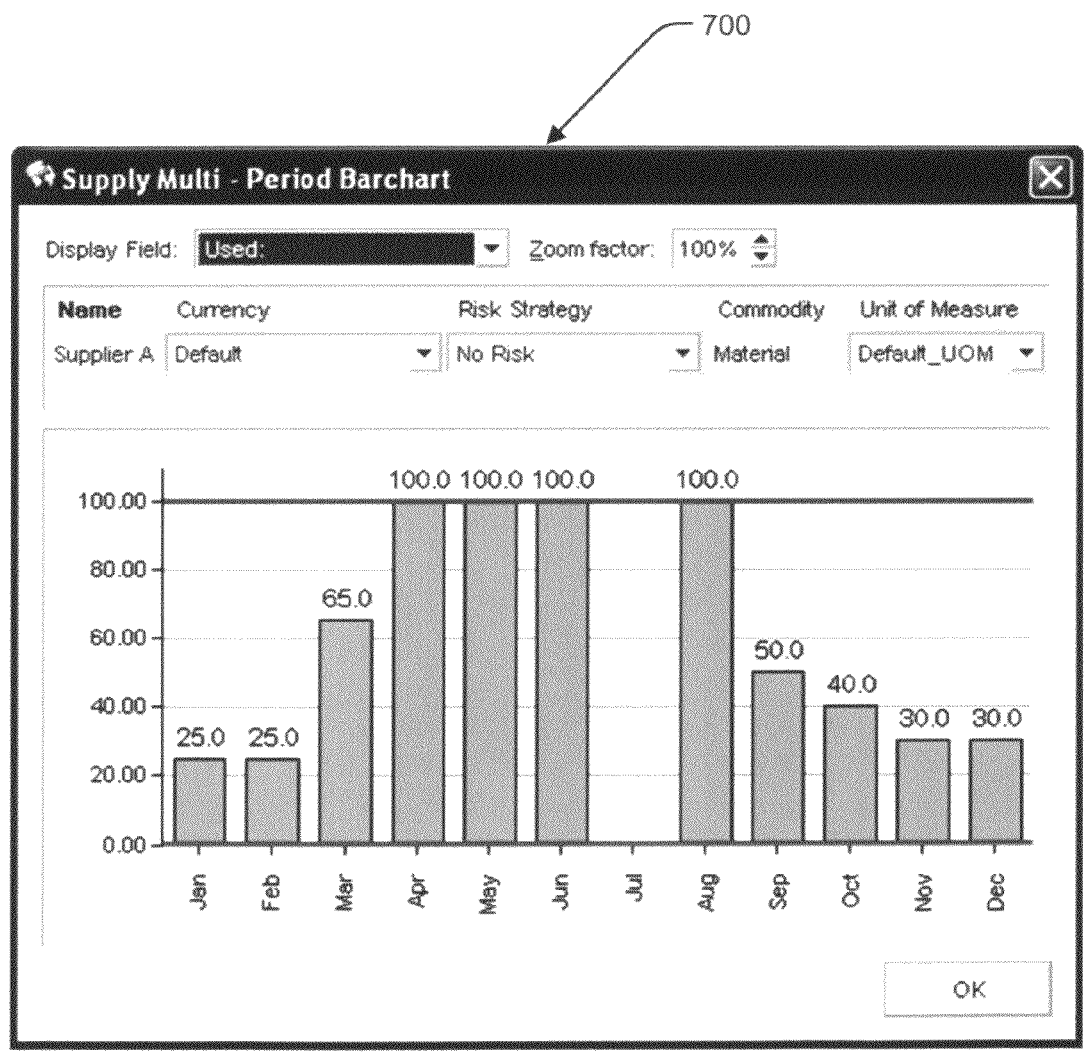
FIG. 7 illustrates an example "incorrect deliveries from Supplier A in response to unplanned event" graph.

The quantity of demand per month is shown in a "Quantity of Demand at Demand Point graph" 400 of FIG. 4. The graph 400 shows a substantial demand increase in July. Due to the cost difference between Supplier A and Supplier B, it is more economical to purchase product from Supplier A and hold inventory at the demand point in anticipation of the months when the demand exceeds the capacity of Supplier A (100 units/month) rather than to purchase them from Supplier B. With this in mind, a cost effective solution to this minimize problem is to source the product from Supplier A according to the plan illustrated in FIG. 5, which illustrates deliveries from Supplier A in the plan. As material is acquired from Supplier A before the demand, inventory will accumulate at the Demand point as illustrated in FIG. 6.

Notice how product is acquired from Supplier A in advance of peak demand and how it is stored at the demand point. This is a cost-effective solution based on no unplanned events occurring. But unplanned events may occur. For example, a fire may close Supplier A for July. Entities concerned with managing supply chain risk may want to be able to prepare plans to use in the event of such unplanned events. These plans are not to pre-account for an event, but are to provide a planned response (e.g., optimal response) to a change caused by an unplanned event. Therefore, a planning exercise may include asking "what if" questions. For example, "what if" Supplier A unexpectedly failed for the month of July (peak month). In this example, the correct course of action may be to switch to the more expensive Supplier B for the month of July. In a complex supply chain with many levels and millions of variables and constraints, the course of action may not be so obvious.

An unplanned event can be modeled by specifying, for example, a rule that modifies the capacity attribute of Supplier A for July. An unplanned event representation can be configured to reflect the loss of capacity at Supplier A. For example, a rule and/or record like that illustrated below may be created and fixed in a tangle medium as:

Unplanned Event: For July, capacity at "Supplier A"=0

A conventional approach to handling this change would be to model the event in the linear programming formulation by adding the constraint $A_7=0$. This will lead to the result for shipments from Supplier A illustrated in FIG. 7 (Incorrect deliveries from Supplier A in response to unplanned event) and inventory levels at the demand point illustrated in FIG. 8 (Incorrect inventory levels at Demand point in response to unplanned event).

Figure 8:
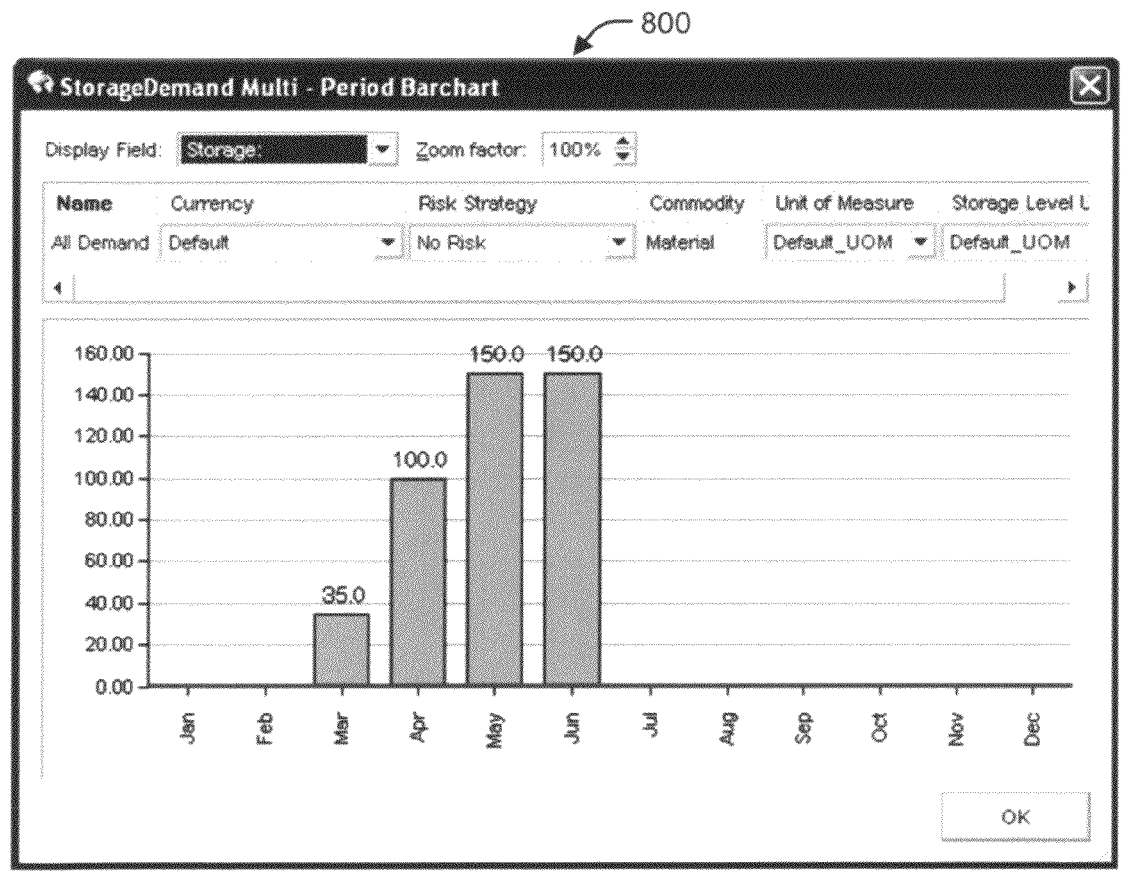
FIG. 8 illustrates an example "incorrect inventory levels at demand point in response to unplanned event" graph.

The solver has incorrectly "anticipated" the capacity disruption in July and has ordered more inventory earlier in the horizon from Supplier A to be stored at the demand point. Supplier B is still not used. This result is incorrect because it requires reaching back into time that has already gone by. As the capacity disruption of Supplier A is unplanned, it would have occurred without warning. There would have been no opportunity to pre-order more product from Supplier A to build extra inventory in March, April, May and June as shown in FIG. 8 because the unplanned event did not happen until after orders had already been placed and filled for those months. Pre-ordering is simply not a feasible response because it would require actions to occur somewhere back in time before the occurrence of the unplanned event.

This situation can be remedied by applying the system 100 and/or method 200. More specifically, with reference to the method 200 and FIG. 2, the solver logic 110 solves the model without the application of any unplanned events. This starting solution was illustrated in FIGS. 5 and 6, where there are no deliveries from Supplier B.

Next, the model and/or plan is frozen up to the point in time to which it was solved. Freezing the plan means making the frozen portion unchangeable from the point of view of the exercise. The solver logic 110 selects the next unplanned event in chronological order. In the example there is only one event, so the loss of capacity at Supplier A in the month of July is selected. The solver logic 110 applies the event to the model. This has the effect of adding the constraint $A_7=0$. Rather than recomputing for previous months, which has been shown to produce an invalid result, the solver logic 110 will recompute the plan on a going-forward basis because the existing solution has been frozen (e.g. made invariant) up to the effective date of the unplanned event. Therefore the solver logic 110 solves the model based on the frozen solution, the updated model, and the unplanned event. This has the effect of adding the following constraints:

$A_1=25, A_2=25, A_3=30, A_4=35, A_5=100, A_6=100$ $B_{1...6}=0$ $I_{1...4}=0, I_{5...6}=50$

Figure 9:
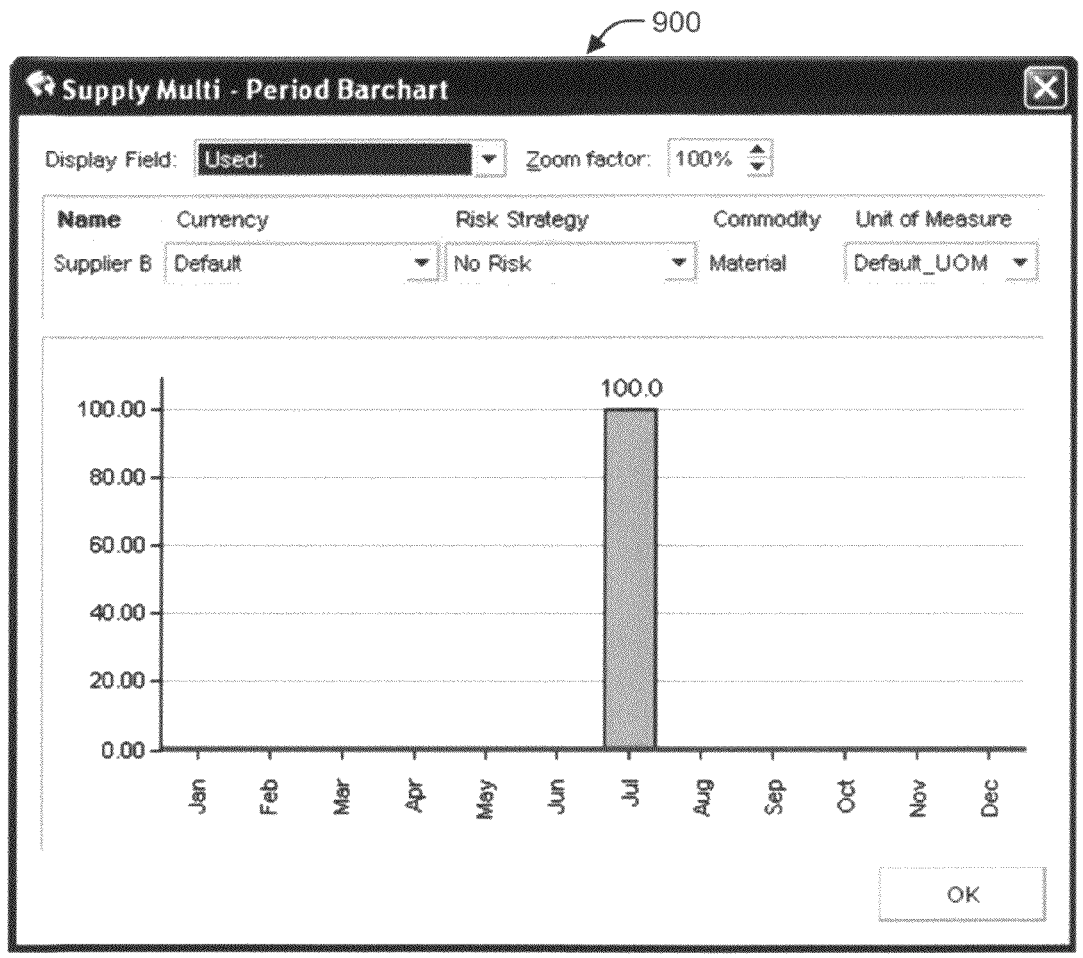
FIG. 9 illustrates an example "correct plan for Supplier B in response to unplanned event" graph.

This results in the solution illustrated in FIG. 9 for Supplier B, showing a plan for a shipment from Supplier B in response to the capacity disruption at Supplier A.

Figure 10:
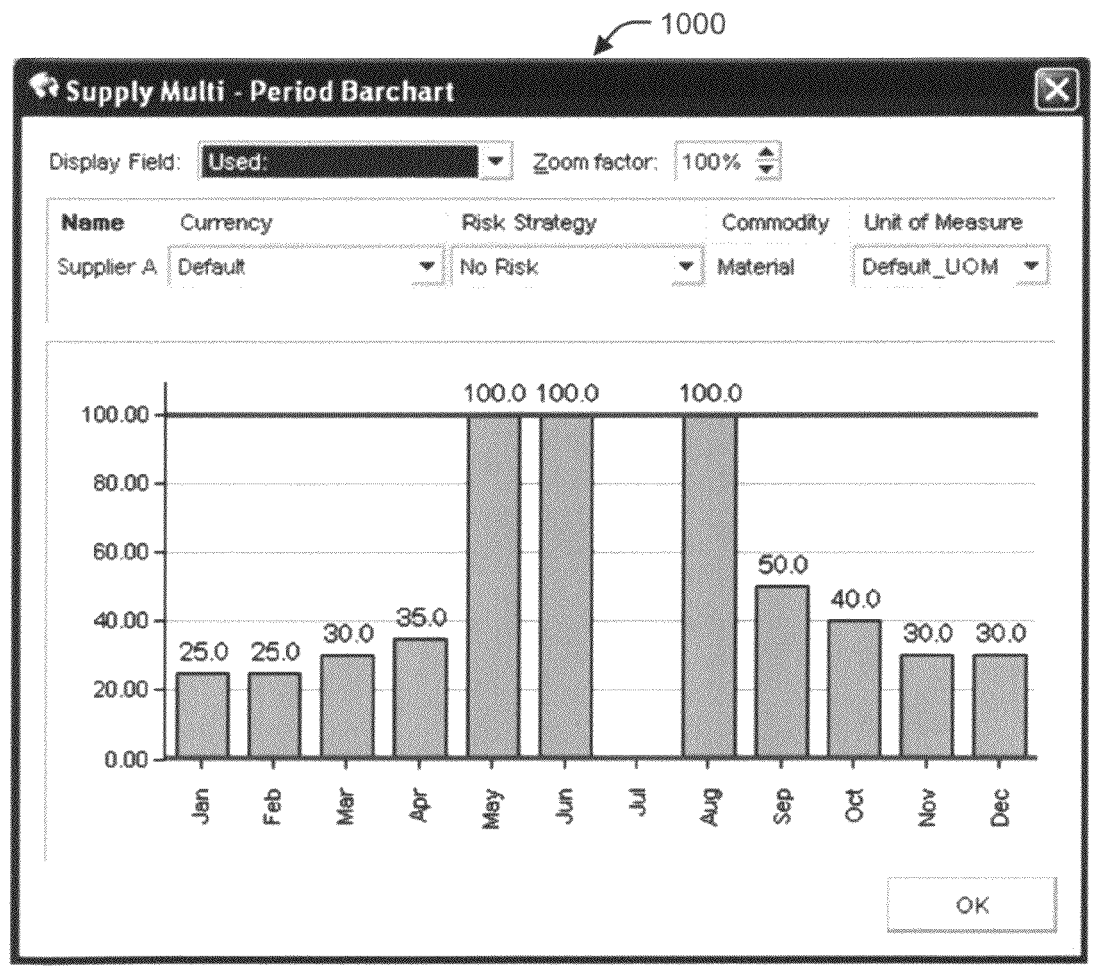
FIG. 10 illustrates an example "correct plan for Supplier A in response to unplanned event" graph.

For this solution the impact on Supplier A shows that the deliveries up to July were not impacted. The non-impact can be seen by comparing months January-June in FIG. 10 with the corresponding months in FIG. 5 to see the differences in the solutions. FIG. 10 illustrates a correct plan for Supplier A in response to the unplanned event.

Figure 11:
FIG. 11 illustrates an example "correct inventory levels at demand point in response to unplanned event" graph.

The inventory levels at the demand point show that no inventory was built in anticipation of the unplanned event (compare levels from January-June in FIG. 11 with the corresponding months in FIG. 6). FIG. 11 illustrates correct inventory levels at the Demand point in response to an unplanned event. Thus, method 200 has produced a response to an unplanned event. This example response has been optimized (e.g., minimized) on supply cost. As mentioned above, a response may be solved based on other business objectives and/or criteria (e.g., maximize throughput, balance profit and risk).

Although linear programming was used in this example, those skilled in the art will recognize that example systems and methods can be used with other solver technology including, but not limited to, constraint-based systems, mixed integer programming, network programming, dispatch-rules and simulation, and so on.

Figure 12:
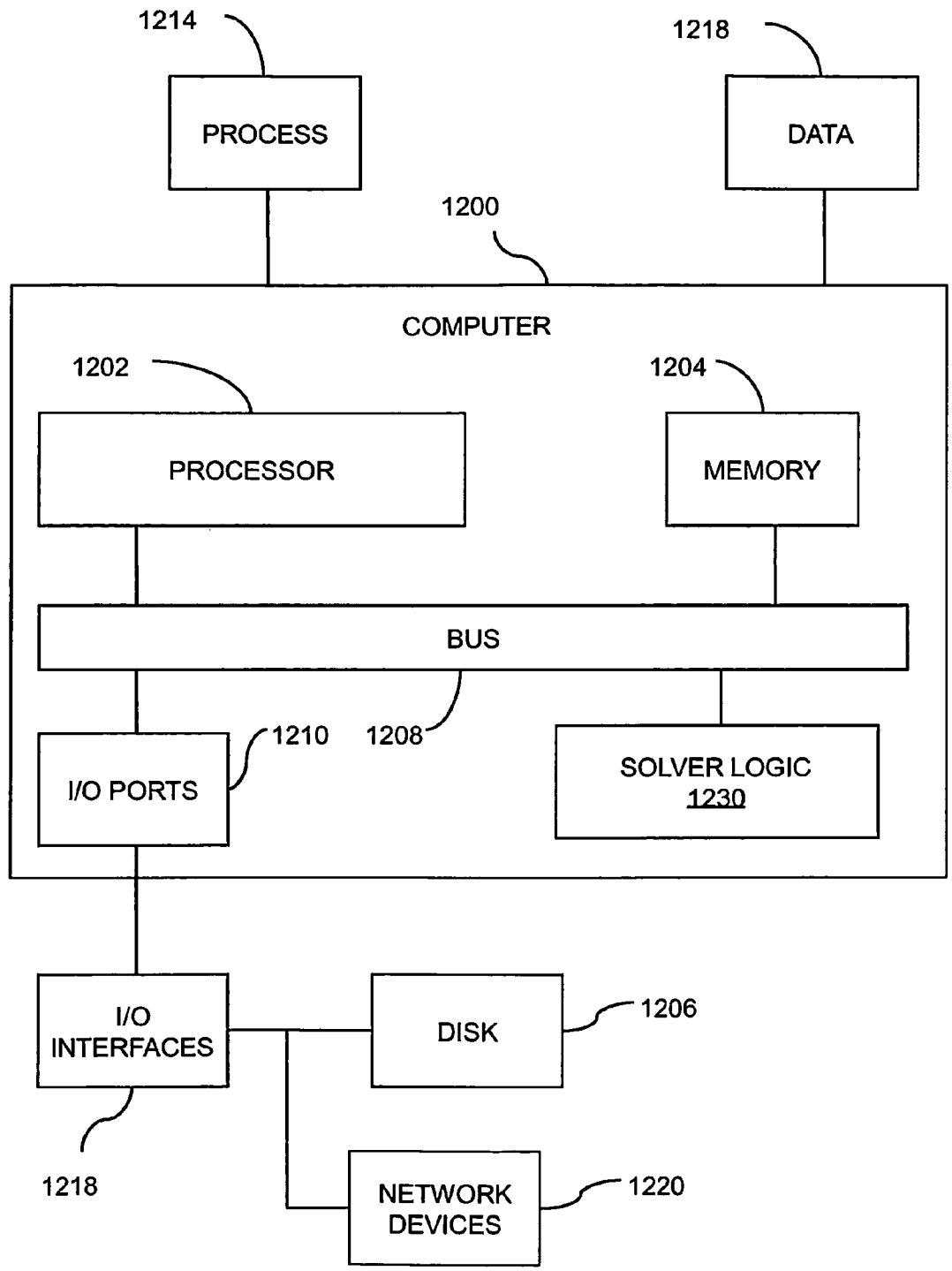
FIG. 12 illustrates an example computing environment in which example systems and methods illustrated herein can operate.

FIG. 12 illustrates an example computing device in which example systems and methods described herein, and equivalents, can operate. The example computing device may be a computer 1200 that includes a processor 1202, a memory 1204, and input/output ports 1210 operably connected by a bus 1208. In one example, the computer 1200 may include a solver logic 1230 to facilitate planning an optimized response to an unplanned event. The solver logic 1230 can be implemented similar to the solver logic 110 described in FIG. 1 and/or other systems and methods described herein.

Generally describing an example configuration of the computer 1200, the processor 1202 can be a variety of various processors including dual microprocessor and other multiprocessor architectures. The memory 1204 can include volatile memory and/or non-volatile memory. The non-volatile memory can include, but is not limited to, ROM, PROM, erasable PROM (EPROM), and so on. Volatile memory can include, for example, RAM, synchronous RAM (SRAM), dynamic RAM (DRAM), synchronous DRAM (SDRAM), double data rate SDRAM (DDR SDRAM), direct RAM bus RAM (DRRAM), and so on.

A disk 1206 may be operably connected to the computer 1200 via, for example, an input/output interface (e.g., card, device) 1218 and an input/output port 1210. The disk 1206 may be, for example, a magnetic disk drive, a solid state disk drive, a floppy disk drive, a tape drive, a Zip drive, a flash memory card, a memory stick, and so on. Furthermore, the disk 1206 may be an optical drive (e.g., CD-ROM, CD recordable drive (CD-R drive), CD rewriteable drive (CD-RW drive), digital video ROM drive (DVD ROM)) and so on. The memory 1204 can store processes 1214 and/or data 1216, for example. The disk 1206 and/or memory 1204 can store an operating system that controls and allocates resources of the computer 1200.

The bus 1208 can be a single internal bus interconnect architecture and/or other bus or mesh architectures. While a single bus is illustrated, it is to be appreciated that computer 1200 may communicate with various devices, logics, and peripherals using other busses that are not illustrated (e.g., PCIE, SATA, Infiniband, 1394, USB, Ethernet). The bus 1208 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1200 may interact with input/output devices via i/o interfaces 1218 and input/output ports 1210. Input/output devices can include, but are not limited to, a keyboard, a microphone, a pointing and selection device, cameras, video cards, displays, disk 1206, network devices 1220, and so on. The input/output ports 1210 can include but are not limited to, serial ports, parallel ports, and USB ports.

The computer 1200 can operate in a network environment and thus may be connected to network devices 1220 via the i/o devices 1218, and/or the i/o ports 1210. Through the network devices 1220, the computer 1200 may interact with a network. Through the network, the computer 1200 may be logically connected to remote computers. The networks with which the computer 1200 may interact include, but are not limited to, a local area network (LAN), a wide area network (WAN), and other networks. The network devices 1220 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 1220 can connect to WAN technologies including, but not limited to, point to point links, circuit switching networks (e.g., integrated services digital networks (ISDN)), packet switching networks, and digital subscriber lines (DSL).

Figure 13:
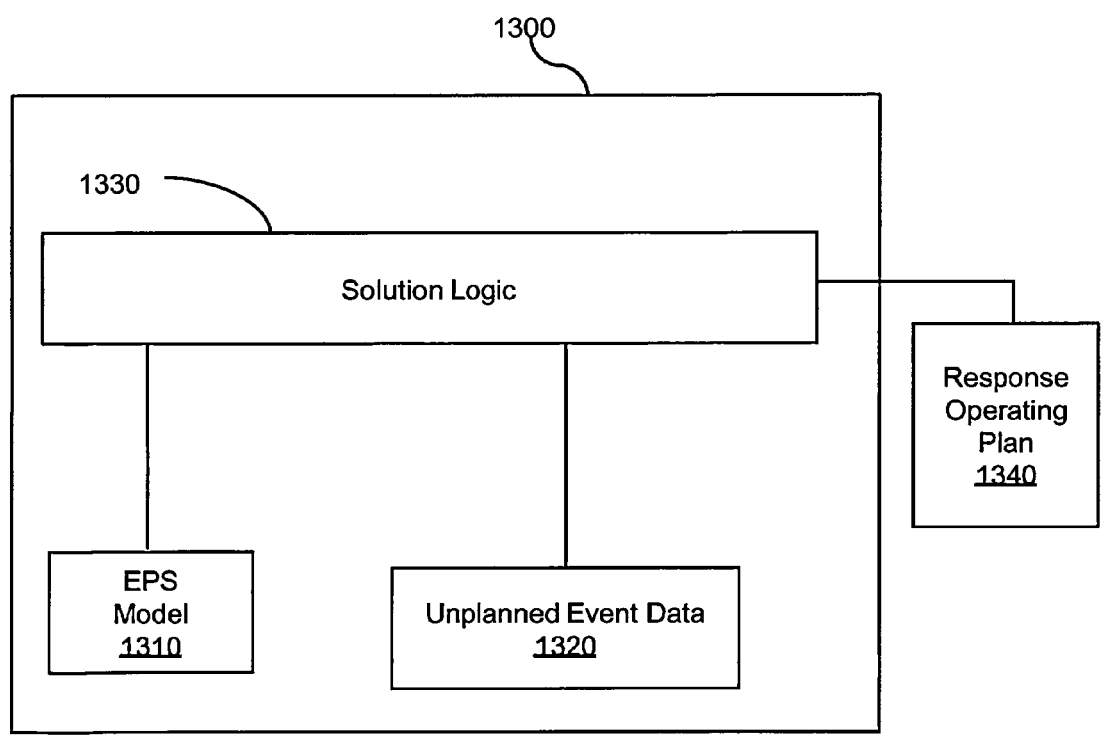
FIG. 13 illustrates an example system associated with planning a response to an unplanned event.

FIG. 13 illustrates a system 1300 associated with planning a response to an unplanned event. System 1300 may include a first data store 1310 that stores an EPS model. In one example, the EPS model includes data describing supply chain entities having attributes associated with managing supply chain risk. While supply chain risk is described, it is to be appreciated that an EPS model may address other enterprise concerns including, but not limited to, distribution channel management, production planning, and so on. In one example, the EPS model in the first data store 1310 is to be accessed preparatory to solving the EPS model before applying any unplanned events. This first solution of the EPS model may be viewed as a first operating plan that is then available as a base from which a second (e.g., "response") operating plan can deviate in light of unplanned events.

System 1300 may also include a second data store 1320 that stores a data structure associated with unplanned event data. The data structure may include a first field that stores data representing an unplanned event identifier, a second field that stores data representing an unplanned event effective time, and a third field that stores data representing an unplanned event completion time. The data structure may also include a fourth field that stores data representing an entity attribute modification rule to be applied to an entity identified by the unplanned event identifier during a time period between the unplanned event effective time and the unplanned event completion time. Thus, the second data store 1320 stores data to identify an unplanned event and to describe the unplanned event. The description of the unplanned event may include information concerning how the unplanned event is to be applied to the model. This information may include, for example, a rule for modifying an attribute of an entity in the model. While four fields are described, it is to be appreciated that a greater and/or lesser number of fields may be employed.

System 1300 may also include a solution logic 1330 that provides a response operating plan that solves the EPS model on a going forward basis with respect to a set of solution criteria in light of the unplanned event. In one example, solving the EPS model includes optimizing the response operating plan with respect to a member(s) of the set of solution criteria.

In one example, the solution logic 1330 is to access the data structure in the second data store 1320 to acquire unplanned event data. The solution logic 1330 is then to apply the unplanned event associated with the data structure to the EPS model stored in the first data store 1310 to produce an updated model. This updated model now reflects the reality of the model as influenced by the unplanned event. To prevent the solution logic 1330 from reaching back in time to account for an unplanned event, the solution logic 1330 may make the first operating plan invariant up to a point in time related to the unplanned event effective time.

With the modified model and the partially invariant operating plan available, the solution logic 1330 may then produce a response operating plan 1340 to solve the updated model with respect to the solution criteria in light of the changed model and partially invariant plan. The solution logic 1330 may then store the response operating plan 1340 in a tangible fixed medium, display a portion of the response operating plan 1340 on a display medium, provide the response operating plan 1340 to a user or other system, and so on.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications may appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer executable instructions that when executed by a computer cause the computer to perform associated actions, the executable instructions comprising instructions for:
accessing, by at least a processor of the computer, a first data structure that stores an enterprise model for supply chain planning associated with an enterprise planning system (EPS), where the enterprise model includes data in the first data structure describing one or more supply chain entities having one or more attributes;
producing, by at least the processor, an operating plan in a second data structure that solves the enterprise model with respect to a business objective and a set of solution criteria;
accessing, by at least the processor, a set of event data that describes an unplanned event to be applied to the enterprise model, where the unplanned event is a future event;
applying, by at least the processor, the unplanned event to the enterprise model to produce an updated model that is modified by the unplanned event beginning at an effective time of the unplanned event in the future;
locking, by at least the processor, a portion of the second data structure of the operating plan to produce a partially invariant operating plan that includes an unmodifiable segment prior to the effective time of the unplanned event and a modifiable segment subsequent to the effective time of the unplanned event, wherein the locking prevents the operating plan from reaching back in time prior to the effective time to account for the unplanned event; and
producing, in a third data structure, by at least the processor, a response operating plan that solves the updated model with respect to the business objective and the solution criteria in light of the partially invariant operating plan, the updated model, and the unplanned event, where the response operating plan includes the unmodifiable segment and a solution segment.

2. The non-transitory computer-readable medium of claim 1, where the EPS is configured to manage supply chain risk, and where the operating plan details operations for an enterprise for a planning interval.

3. The non-transitory computer-readable medium of claim 1, where the solution segment is produced to resolve the effects of the unplanned event, and where the unmodifiable segment is unalterable when producing the response operating plan.

4. The non-transitory computer-readable medium of claim 1, where the set of solution criteria includes one or more of, a cost criteria, a time criteria, a continuity criteria, a profit criteria, a user satisfaction criteria, a throughput criteria, and a risk avoidance criteria.

5. The non-transitory computer-readable medium of claim 1, where solving the enterprise model with respect to the business objective includes instructions for maximizing a member of the set of solution criteria, minimizing a member of the set of solution criteria, balancing two or more members of the set of solution criteria, or reducing the variance in a member of the set of solution criteria.

6. The non-transitory computer-readable medium of claim 1, where the set of event data includes an entity identifier, an event effective time, an event end time in the future that is after the effective time, and an attribute modifier.

7. The non-transitory computer-readable medium of claim 6, where the attribute modifier describes a fixed value for an attribute.

8. The non-transitory computer-readable medium of claim 6, where the attribute modifier describes a function for modifying an attribute based on an existing value for the attribute.

9. The non-transitory computer-readable medium of claim 6, where the attribute modifier comprises a reference to an external value.

10. The non-transitory computer-readable medium of claim 1, where applying the unplanned event data to the enterprise model includes instructions for changing an attribute for an entity in the enterprise model in response to the attribute modifier.

11. The non-transitory computer-readable medium of claim 1, where the response operating plan is a contingency plan for the unplanned event.

12. The non-transitory computer-readable medium of claim 1, where the set of solution criteria are user configurable.

13. The non-transitory computer-readable medium of claim 1, where the set of event data describes a set of unplanned events to be applied to the enterprise model as an unplanned event scenario.

14. A system, comprising:
a first data store to store an enterprise planning system (EPS) model that is configured to be updated by a processor based, at least in part, on an unplanned event to simulate effects of the unplanned event on one or more supply chain entities, where the unplanned event is a future event;
a second data store to store a data structure comprising:
a first field containing data representing an identifier for the unplanned event;
a second field containing data representing an effective time for the unplanned event;
a third field containing data representing a completion time for the unplanned event; and
a fourth field containing data representing an entity attribute modification rule to be applied to an entity identified by the identifier during a time period between the effective time and the completion time; and
a non-transitory computer-readable medium including a solution logic comprising instructions stored thereon that are configured to cause at least the processor to generate a response operating plan that solves the EPS model based, at least in part, on a set of solution criteria, the unplanned event, and a partially invariant operating plan that includes a frozen plan segment prior to the effective time, where solving the EPS model includes optimizing the response operating plan with respect to one or more members of the set of solution criteria, and where the response operating plan includes the frozen plan segment.

15. The system of claim 14, where the EPS model includes data describing one or more supply chain entities having one or more entity attributes associated with managing supply chain risk, and where the one or more supply chain entities are one or more of, suppliers, manufacturers, distribution channels, warehouses, supply forecasts, demand forecasts, or transportation forecasts.

16. The system of claim 14, the solution logic being configured to access the EPS model in the first data store and to solve the EPS model before applying the unplanned event, where solving the EPS model prior to updating the EPS model with the unplanned event produces a first operating plan.

17. The system of claim 16, the solution logic being configured to access the data structure in the second data store, to apply the unplanned event associated with the data structure to the EPS model to produce an updated model, and to make the first operating plan invariant up to a point in time related to the unplanned event effective time to produce the partially invariant operating plan.

18. The system of claim 17, the solution logic being configured to produce the response operating plan to solve the updated model with respect to the solution criteria in light of the partially invariant operating plan and the updated model.

19. The system of claim 18, where the response operating plan is a contingency plan, and where the EPS model is not a real-time model.

20. A non-transitory computer-readable medium storing computer executable instructions that when executed by a computer cause the computer to perform associated actions using at least a processor, wherein the executable instructions comprise instructions configured for:
producing, by at least the processor, an updated model in a first data structure based, at least in part, on an unplanned event and a first model, where the unplanned event is a future event;
locking, by at least the processor, a portion of an operating plan in a second data structure for a period prior to the unplanned event to produce a partially invariant operating plan that includes a locked segment for the period prior to an effective time of the unplanned event and a modifiable segment for a period after the effective time of the unplanned event, where the operating plan is a solution to the first model, wherein the locking prevents the operating plan from reaching back in time prior to the effective time to account for the unplanned event; and
solving, by at least the processor, the updated model based, at least in part, on the partially invariant operating plan, the updated model, and the unplanned event to produce a response operating plan that includes the locked segment and a response segment, where the locked segment is unmodifiable when producing the response operating plan.

21. The computer-readable medium of claim 20, where locking a portion of the operating plan to produce a partially invariant operating plan facilitates solving the updated model to produce the response operating plan by preventing the response operating plan from anticipating the impact of the unplanned event by accounting for the unplanned event before the effective time of the unplanned event, and where the response operating plan is a predicted response for the unplanned event.

22. The computer-readable medium of claim 20, where the first model represents an enterprise concern that is affected by the unplanned event and where the enterprise concern is one or more of a set of suppliers, a set of manufacturers, a set of distribution channels, a set of warehouses, supply forecasts, demand forecasts, or transportation forecasts.

23. The computer-readable medium of claim 20, where solving the updated model to produce a response operating plan includes instructions for selecting between an optimal response or an acceptable response based, at least in part, on a response period of time, and where the response operating plan is a contingency plan for the unplanned event.

* * * * *

UNITED STATES PATENT AND TRADEMARK OFFICE
CERTIFICATE OF CORRECTION

PATENT NO.        : 9,147,171 B2
APPLICATION NO.   : 11/975820
DATED             : September 29, 2015
INVENTOR(S)       : Sitarski It is certified that error appears in the above-identified patent and that said Letters Patent is hereby corrected as shown below:

In The Specification

In column 3, line 57, delete "servelet," and insert -- servlet, --, therefor.

In column 7, line 52, delete "January. to December. )." and insert -- January to December). --, therefor.

Signed and Sealed this
Twelfth Day of July, 2016

Michelle K. Lee
*Director of the United States Patent and Trademark Office*